(12) United States Patent
Trimboli (10) Patent No.: US 9,702,465 B1
(45) Date of Patent: Jul. 11, 2017

(54) SEAL FOR CYLINDRICAL PORTS

(71) Applicant: David F Trimboli, Royal Oak, MI (US)

(72) Inventor: David F Trimboli, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/232,885

(22) Filed: Aug. 10, 2016

(51) Int. Cl.
*F16J 15/02* (2006.01)

(52) U.S. Cl.
CPC .................... *F16J 15/022* (2013.01)

(58) Field of Classification Search
CPC ........... F16J 15/10; F16J 15/102; F16J 15/104
See application file for complete search history.

(56) References Cited

U.S. PATENT DOCUMENTS

| | | | |
|---|---|---|---|
| 4,103,903 A | 8/1978 | Capriotti et al. | |
| 4,401,093 A * | 8/1983 | Gates, Jr. ............... | F01M 11/04 123/572 |
| 4,456,268 A * | 6/1984 | Penn ...................... | F02B 77/00 277/598 |
| 4,901,681 A * | 2/1990 | Pozniak .................. | F02B 75/22 123/184.31 |
| 5,484,466 A * | 1/1996 | Brown ............... | B01D 46/0004 55/498 |
| 5,513,603 A * | 5/1996 | Ang ........................ | F02F 7/006 123/198 E |
| 6,039,323 A * | 3/2000 | Mockenhaupt ......... | F02F 7/006 277/593 |
| 6,863,039 B2 * | 3/2005 | Salameh ................. | F02F 7/006 123/195 C |
| 7,234,706 B2 * | 6/2007 | Seymour, II ............ | F02F 7/006 277/591 |
| 8,246,726 B2 * | 8/2012 | Yano .................... | B60R 16/0239 123/41.86 |
| 2006/0012125 A1 * | 1/2006 | Salameh ................ | F02F 11/002 277/325 |
| 2010/0109258 A1 * | 5/2010 | Smith ..................... | F02F 7/006 277/594 |

* cited by examiner

*Primary Examiner* — Gilbert Lee
(74) *Attorney, Agent, or Firm* — Ralph E. Smith (57) ABSTRACT

A seal assembly includes an outer member and an annular seal. The outer member includes an outer wall and a landing. The outer wall has a cylindrically shaped inner surface disposed about an axis and configured to oppose an outer cylindrical surface of a port. The landing extends radially inward from the inner surface of the outer wall. The annular seal member is disposed about the axis and has an inner cylindrical surface, a bottom axial surface, an outer cylindrical surface, and a circumferential groove. The inner cylindrical surface of the seal member is configured seal with the outer cylindrical surface of the port. The circumferential groove is open at the outer cylindrical surface of the seal member and extends radially inward. The landing extends into the circumferential groove and is in sealing contact with the circumferential groove.

20 Claims, 4 Drawing Sheets

SEAL FOR CYLINDRICAL PORTS

FIELD

The present disclosure relates to a seal for cylindrical ports.

BACKGROUND

This section provides background information related to the present disclosure and is not necessarily prior art.

Fluid connections between mating parts, wherein one of the parts (e.g., an inner part) includes a cylindrical port and the other of the parts (e.g., an outer part) is received about the port, are typically sealed by an o-ring. One example of such a fluid connection between inner and outer parts is that between a valve cover and an oil-mist separator of an internal combustion engine. The o-ring is typically disposed about a cylindrical port of the inner member (e.g., the valve cover) and forms a seal between the cylindrical port and the outer member (e.g., the oil-mist separator). Typical o-rings only seal along their inner and outer circumferential surfaces. In some applications, gaps form between the o-ring and the mating parts due to vibration (e.g., minor relative movement of the parts) or distortion of the parts (e.g., differential thermal expansion or contraction, or assembly force deformation). In some applications these gaps permit fluid to leak past the o-ring, and over time, movement of the parts relative to the o-ring leads to degradation of the o-ring and additional noise or vibration of the parts.

SUMMARY

This section provides a general summary of the disclosure, and is not a comprehensive disclosure of its full scope or all of its features.

In accordance with an aspect of the present disclosure, a seal assembly includes an outer member and an annular seal. The outer member includes an outer wall and a landing. The outer wall has a cylindrically shaped inner surface disposed about an axis and configured to oppose an outer cylindrical surface of a port. The landing extends radially inward from the inner surface of the outer wall. The annular seal member is disposed about the axis and has an inner cylindrical surface, a bottom axial surface, an outer cylindrical surface, and a circumferential groove. The inner cylindrical surface of the seal member is configured to form a seal with the outer cylindrical surface of the port. The circumferential groove is open at the outer cylindrical surface of the seal member and extends radially inward. The landing extends into the circumferential groove and is in sealing contact with the circumferential groove.

In accordance with an aspect of the present disclosure, the seal assembly further includes an inner member. The inner member includes an opposing wall and the port. The port extends axially outward from the opposing wall to an end of the port. The landing is disposed axially between the opposing wall of the inner member and the end of the port.

In accordance with an aspect of the present disclosure, the bottom axial surface of the seal member is in sealing contact with the opposing wall of the inner member.

In accordance with an aspect of the present disclosure, the seal member is formed of a compressive material and the seal member has an uncompressed axial length between the circumferential groove and the bottom axial surface that is greater than an axial distance between the landing and the opposing wall of the inner member.

In accordance with an aspect of the present disclosure, the outer member is fixedly coupled to the inner member.

In accordance with an aspect of the present disclosure, the seal assembly further includes a plurality of fasteners. The outer member further includes a flange fixedly coupled to the outer wall. The fasteners fixedly couple the flange to the opposing wall of the inner member.

In accordance with an aspect of the present disclosure, the seal member is formed of a compressive material and an uncompressed diameter of the inner cylindrical surface of the seal member is less than a diameter of the outer cylindrical surface of the port.

In accordance with an aspect of the present disclosure, the inner member and the outer member are formed of different materials having different thermal expansion properties.

In accordance with an aspect of the present disclosure, the outer member further includes a chamber wall. The chamber wall extends radially inward from the inner surface of the outer wall and is spaced apart from the landing. The chamber wall is in sealing contact with a top axial surface of the seal member.

In accordance with an aspect of the present disclosure, the chamber wall has an inner diameter that is less than an outer diameter of the outer cylindrical surface of the port.

In accordance with an aspect of the present disclosure, the seal member is formed of a compressive material and the seal member has an uncompressed axial length between the groove and the top axial surface that is greater than an axial distance between the landing and the chamber wall.

In accordance with an aspect of the present disclosure, the seal member is formed of a compressive material and an uncompressed diameter of the outer cylindrical surface of the seal member is greater than a diameter of the inner surface of the outer wall.

In accordance with an aspect of the present disclosure, a diameter of the outer cylindrical surface of the seal member is less than a diameter of the inner surface of the outer wall such that the outer cylindrical surface of the seal member and the inner surface of the outer wall are spaced apart to define a gap therebetween.

In accordance with an aspect of the present disclosure, the circumferential groove extends radially inward from the outer cylindrical surface of the seal member to an inner trough surface. The landing extends radially inward from the outer wall to an inner landing surface. The inner trough surface has a diameter that is less than a diameter of the inner landing surface such that the inner trough surface is spaced apart from the inner landing surface to define a gap therebetween.

In accordance with an aspect of the present disclosure, the seal member is formed of a compressive material and an uncompressed axial width of the circumferential groove is less than an axial thickness of the landing.

In accordance with an aspect of the present disclosure, a seal assembly includes an inner member and an annular seal member. The inner member includes an opposing wall and a port extending axially from the opposing wall along an axis to an end of the port. The port includes an outer cylindrical surface and a landing. The outer cylindrical surface is disposed about the axis and configured to oppose a cylindrically shaped inner surface of an outer member. The landing extends radially outward from the outer cylindrical surface of the port and is disposed axially between the opposing wall and the end of the port. The annular seal member is disposed about the axis and has an inner cylindrical surface, a bottom axial surface, an outer cylindrical surface, and a circumferential groove. The inner cylindrical surface of the seal member is in sealing contact with the outer cylindrical surface of the port. The circumferential groove is open at the inner cylindrical surface of the seal member and extends radially outward. The landing extends into the circumferential groove and is in sealing contact with the circumferential groove. The bottom axial surface of the seal member is in sealing contact with the opposing wall of the inner member.

In accordance with an aspect of the present disclosure, the seal assembly further includes an outer member. The outer member includes an outer wall. The outer wall has a cylindrically shaped inner surface disposed about the axis and opposing the outer cylindrical surface of the port. The outer member is fixedly coupled to the inner member.

In accordance with an aspect of the present disclosure, the seal member is formed of a compressive material. An uncompressed diameter of the inner cylindrical surface of the seal member is less than a diameter of the outer cylindrical surface of the port. An uncompressed diameter of the outer cylindrical surface of the seal member is greater than a diameter of the inner surface of the outer wall. An uncompressed axial distance between the groove and the bottom axial surface is greater than an axial distance between the landing and the opposing wall of the inner member.

In accordance with an aspect of the present disclosure, the groove extends radially outward from the inner cylindrical surface of the seal member to an outer trough surface. The landing extends radially outward from the outer cylindrical surface to an outer landing surface. The outer trough surface has a diameter that is greater than a diameter of the outer landing surface such that the outer trough surface is spaced apart from the outer landing surface to define a gap therebetween.

In accordance with an aspect of the present disclosure, the seal member is formed of a compressive material and the outer member further includes a chamber wall. The chamber wall extends radially inward from the inner surface of the outer wall and is spaced apart from the landing. The chamber wall is in sealing contact with a top axial surface of the seal member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

The present teachings are directed toward a seal assembly that includes an inner member, an outer member, and a seal member. The inner member includes cylindrically extending port. The seal member is in sealing contact with an outer cylindrical surface of the port and along another surface of the inner member. The outer member includes a landing that extends radially inward into a groove formed on an outer cylindrical surface of the seal member to form a seal between the seal member and the outer member. The seal member also provides vibration damping between the inner and outer members and allows for continued sealing despite differential thermal expansion/contraction of the inner and outer members. In this way, the seal member reduces noise and wear, while also accommodating distortions due to normal stack up tolerances as well as assembly forces.

Figure 1:
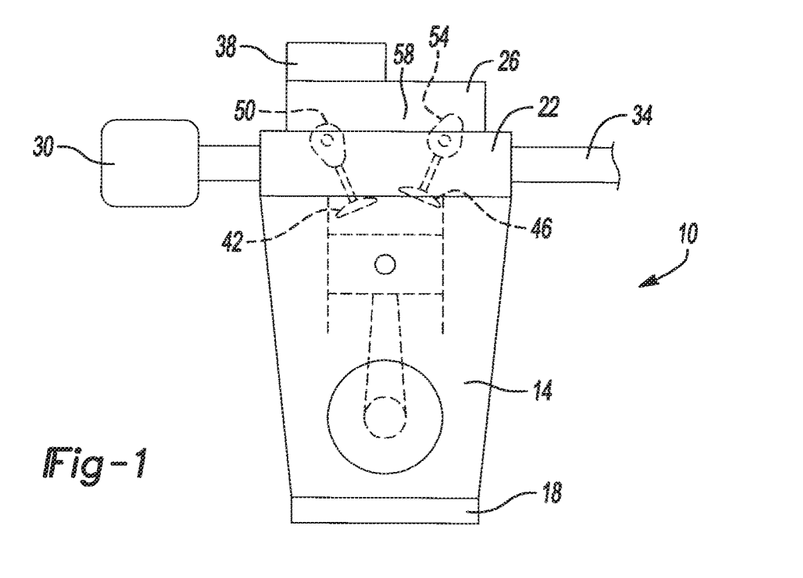
FIG. 1 is a schematic view of an engine assembly in accordance with the present teachings.

With reference to FIG. 1, an internal combustion engine 10 is schematically illustrated. While the invention is described herein with reference to an internal combustion engine, the seal assembly of the present invention is applicable to form a seal between inner and outer members of other applications besides an engine. In the example provided, the engine 10 includes an engine block 14, an oil sump 18, a cylinder head 22, an inner member 26, an intake manifold 30, an exhaust manifold 34, and an outer member 38. In the example provided, the inner member 26 is a valve cover and the outer member 38 is an oil-mist separator. In the example provided, the engine 10 is a piston-cylinder engine, wherein the pistons, engine block 14, and cylinder head 22 define the combustion chambers of the engine 10.

The intake manifold 30 is configured to receive intake air from outside the engine 10. The intake manifold 30 is coupled to the cylinder head 22 to provide the intake air to combustion chambers of the engine 10, via the cylinder head 22. The cylinder head 22 includes a plurality of intake valves 42 that control flow of intake air into the combustion chambers of the engine 10. The exhaust manifold 34 is coupled to the cylinder head 22 to permit exhaust gases to be expelled from the combustion chambers of the engine 10. The cylinder head 22 includes a plurality of exhaust valves 46 that control the flow of exhaust gases from the combustion chambers of the engine 10. In the example provided, the intake valves 42 are opened or closed by an intake cam shaft 50 and the exhaust valves 46 are opened or closed by an exhaust cam shaft 54. In the example provided, the intake and exhaust cam shafts 50, 54 are disposed within a cavity 58 defined by the cylinder head 22 and the inner member 26. In the example provided, the inner member 26 is mounted to the cylinder head 22 and a gasket (not specifically shown) forms a seal between the cylinder head 22 and the inner member 26. In the example provided, the outer member 38 is mounted to the inner member 26.

Figure 2:
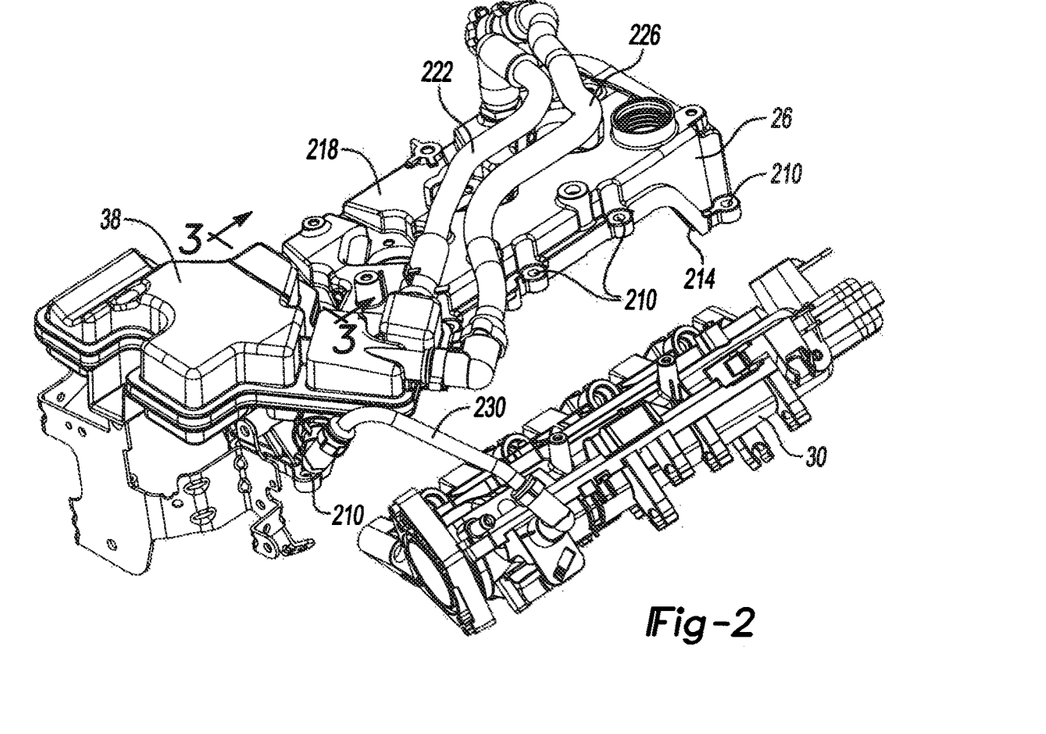
FIG. 2 is perspective view of a portion of the engine assembly of FIG. 1, illustrating an inner member and an outer member.

With additional reference to FIG. 2, the inner member 26, outer member 38, and intake manifold 30 are illustrated in greater detail. In the example provided, the inner member 26 is mounted to the top of the cylinder head 22 (FIG. 1) via fasteners (not shown) that are inserted through mounting apertures 210. The gasket (not shown) forms a seal between the top of the cylinder head 22 (FIG. 1) and a perimeter 214 of the inner member 26 to generally enclose the intake and exhaust cams 50, 54 (FIG. 1) within the cavity 58 (FIG. 1). The outer member 38 is mounted to a top wall 218 of the inner member 26 and is in fluid communication with the cavity 58. The outer member 38 is in fluid communication with the valve cover (i.e., inner member 26) to receive a mixture of oil vapor and air therefrom via conduit 222. The outer member 38 is also in fluid communication with the crankcase of the engine block 14 to receive a mixture of oil vapor and air therefrom via conduit 226. The outer member 38 is generally configured to separate the oil from the air and to recirculate the oil back into the cavity 58 and eventually the crankcase (e.g., the oil sump 18 shown in FIG. 1). In the example provided, the air separated from the oil mist/vapor is sent to the intake manifold 30 via conduit 230. The air returning to the intake manifold 30 may include unburnt fuel vapor. In the example provided, the inner member 26 and the outer member 38 are formed of different materials having different thermal expansion properties. In the example provided, the inner member 26 is aluminum and the outer member 38 is a plastic material. In an alternative construction, the inner member 26 and the outer member 38 are formed of the same material or any other appropriate materials.

Figure 3:
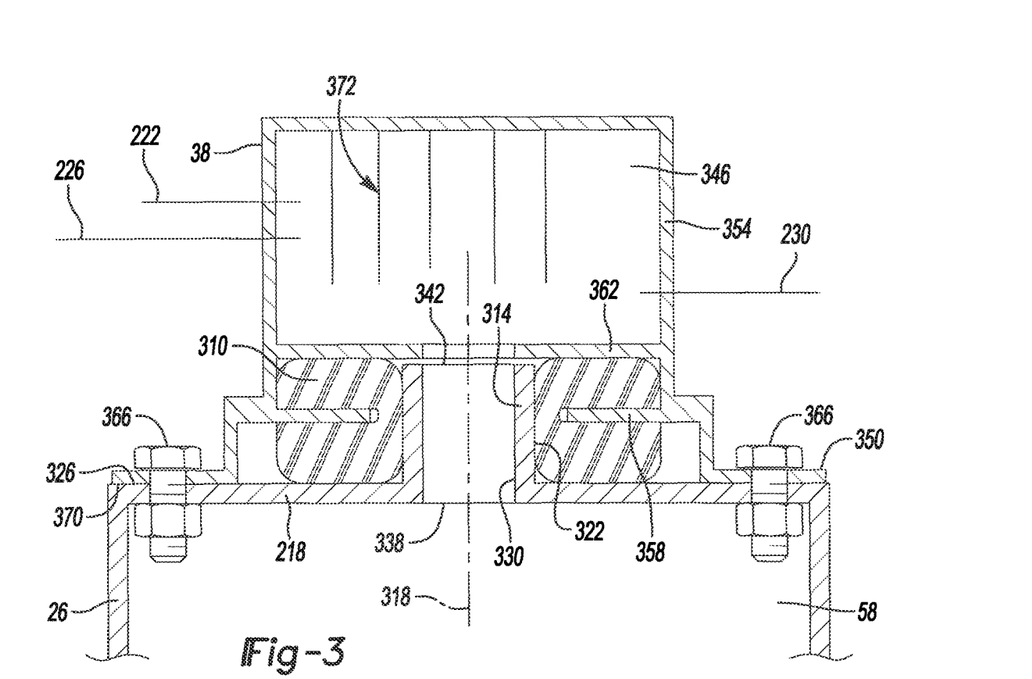
FIG. 3 is a sectional view of a portion of the inner member and outer member, illustrating a seal for sealing the outer member to a cylindrical port of the inner member.

With additional reference to FIG. 3, a sectional view of a portion of the inner member 26 and a portion of the outer member 38 are illustrated including a seal member 310. The inner member 26 includes a cylindrically shaped port 314 disposed about an axis 318. The port 314 extends longitudinally along the axis 318 and outward from the top wall 218 of the inner member 26. The port 314 has an outer cylindrical surface 322 that is disposed about the axis 318 and abuts a top surface 326 of the top wall 218 of the inner member 26. In the example provided, the outer cylindrical surface 322 is perpendicular to the top surface 326. The port 314 has an inner cylindrical surface 330 disposed about the axis 318 that defines a fluid conduit that is open at both ends 338, 342 of the port 314. The fluid conduit defined by the port 314 is open to the cavity 58 at one of the ends 338 and is open to an oil-mist chamber 346 of the outer member 38 at the other end 342 to permit fluid communication from the chamber 346 through the port 314 and into the cavity 58.

The outer member 38 includes a flange 350, an outer wall 354, and a landing 358. In the example provided, the outer member 38 also includes a lower chamber wall 362. The flange 350 is fixedly mounted to the inner member 26 via fasteners 366. In the example provided, the flange 350 includes a flange surface 370 that opposes and contacts the top surface 326 of the inner member 26. The outer wall 354 extends from the flange 350 and encloses the end 342 of the port 314 to define the oil-mist chamber 346. The oil-mist chamber 346 is in fluid communication with one or more conduits (e.g., conduits 222 and 226 shown in FIG. 2 and schematically shown in FIG. 3) to receive the oil vapor/mist and air mixture from the valve cover and/or crankcase as described above. The oil vapor/mist and air mixture from the conduits 222 and 226 impinges on a series of baffles 372 disposed within the oil-mist chamber 346. The oil vapor/ mist coalesces on the baffles 372 as liquid oil and runs down the baffles 372 toward the port 314. The separated oil returns to the cavity 58 and can eventually return to the crankcase (e.g., oil sump 18 shown in FIG. 1). The oil-mist chamber 346 is in fluid communication with one or more conduits (e.g., conduit 230 shown in FIG. 2), to provide air to the intake manifold 30 after the oil vapor has been separated out. The air provided to the intake manifold 30 may include unburnt fuel vapor.

Figure 4:
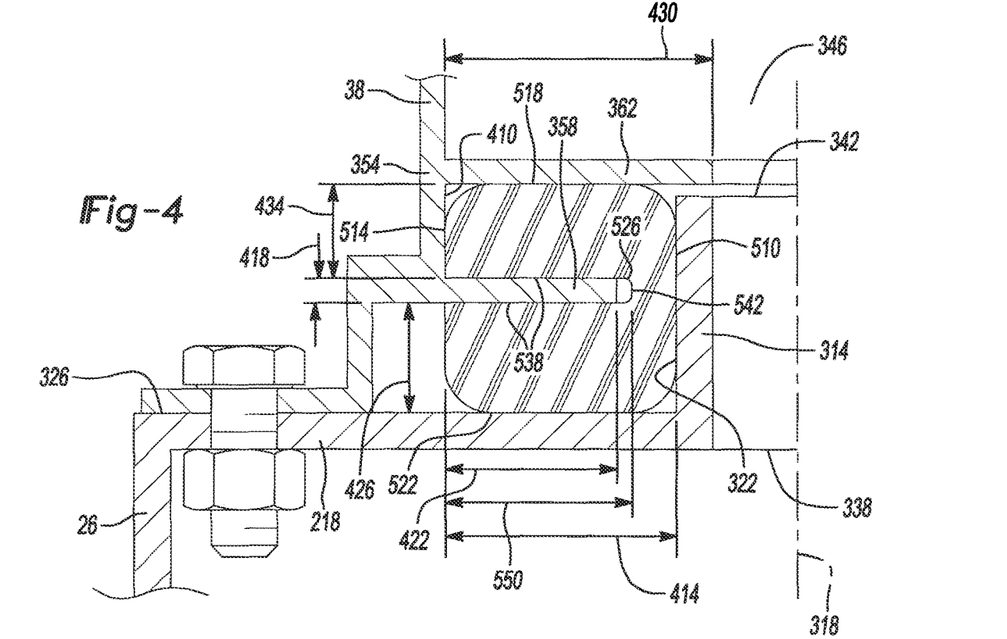
FIG. 4 is a close-up view illustrating a portion of the seal, inner member, and outer member of FIG. 3.

With continued reference to FIG. 3 and additional reference to FIG. 4, The outer wall 354 includes an inner surface 410 that is disposed about the axis 318, radially outward of the outer cylindrical surface 322 of the port 314 and is axially between the end 338 of the port 314 and the top wall 218 of the inner member 26. The inner surface 410 is cylindrical in shape and centered on the axis 318 such that the inner surface 410 has a radial distance 414 between the inner surface 410 and the outer cylindrical surface 322 of the port 314.

The landing 358 is disposed axially between the inner surface 410 and the top wall 218 of the inner member 26. The landing 358 is disc-shaped, having an axial thickness 418 and extending radially inward from the inner surface 410 by a radial length 422 to a cylindrical inner landing surface that forms the inner most surface of the landing 358. The radial length 422 is such that the landing 358 does not extend radially inward all the way to the outer cylindrical surface 322 of the port 314. The axial thickness 418 of the landing 358 is such that the landing 358 is axially spaced apart from the top wall 218 of the inner member 26 by a landing distance 426.

The lower chamber wall 362 is disposed axially between the inner surface 410 and the oil-mist chamber 346. The lower chamber wall 362 is disc-shaped and extends radially inward from the inner surface 410 to have a radial length 430. In the example provided, the end 338 of the port 314 is disposed axially between the lower chamber wall 362 and the landing 358. In the example provided, the radial length 430 of the lower chamber wall 362 is such that the lower chamber wall 362 extends radially inward of the outer cylindrical surface 322 of the port 314. The radial length 430 of the lower chamber wall 362 is such that the lower chamber wall 362 does not extend radially inward of the inner cylindrical surface 330 of the port 314. In the example provided, the lower chamber wall 362 does not contact the port 314. The lower chamber wall 362 is parallel to the landing 358 and spaced apart from the landing 358 by a distance 434. In an alternative construction, not specifically shown, the lower chamber wall 362 contacts the port 314. In an alternative construction, not specifically shown, the outer member 38 does not include the lower chamber wall 362.

Figure 5:
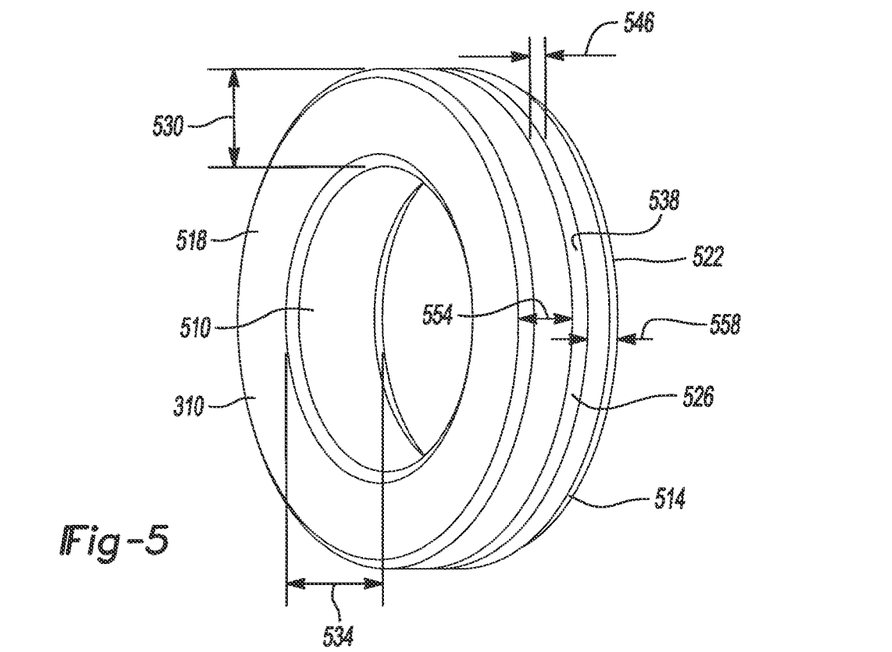
FIG. 5 is a perspective view of the seal of FIG. 3.

With continued reference to FIGS. 3 and 4 and additional reference to FIG. 5, the seal member 310 has an annular shape including an inner seal surface 510, an outer seal surface 514, a top axial surface 518, and a bottom axial surface 522. The seal member 310 also includes a groove 526. In the example provided, the seal member 310 is a resilient material, such as an elastomeric material for example. The inner seal surface 510 and outer seal surface 514 are disposed about the axis 318 in a cylindrical manner. In the example provided, the inner seal surface 510 and the outer seal surface 514 have diameters such that the seal member 310 has a radial width 530. In the example provided, the top axial surface 518 and the bottom axial surface 522 are parallel and spaced apart such that the seal member 310 has an axial length 534. In the example provided, the top axial surface 518 and the bottom axial surface 522 are perpendicular to the axis 318 and the inner seal surface 510 and the outer seal surface 514. In the example provided, the axial length 534 of the seal member 310, is greater than the distance between the top surface 326 of the inner member 26 and the lower chamber wall 362, such that the seal member 310 is axially compressed when the outer member 38 is coupled to the inner member 26.

The groove 526 extends circumferentially about the outer seal surface 514. The groove 526 is open at the outer seal surface 514 and extends radially inward therefrom but terminates radially outward of the inner seal surface 510. The groove 526 is located axially between the top axial surface 518 and the bottom axial surface 522. The groove 526 includes a pair of opposing side surfaces 538 that extend radially inward from the outer seal surface 514 to an inner trough surface 542 (best shown in FIG. 4) that extends axially between the side surfaces 538. In the example provided, the side surfaces 538 are spaced apart by a groove width 546 and are parallel to each other. The trough surface 542 (best shown in FIG. 4) is spaced apart from the outer seal surface 514 such that the groove 526 has a depth 550 (best shown in FIG. 4). In the example provided, the side surface 538 proximate to the top axial surface 518 is parallel to and spaced apart from the top axial surface 518 by a top axial seal length 554. In the example provided, the side surface 538 proximate to the bottom axial surface 522 is parallel to and spaced apart from the bottom axial surface 522 by a bottom axial seal length 558.

With specific reference to FIG. 4, the inner seal surface 510 contacts the outer cylindrical surface 322 of the port 314 to form a seal therewith. In the example provided, the diameter of the inner seal surface 510 is less than the diameter of the outer cylindrical surface 322 of the port 314, such that the seal member 310 has a press fit or an interference fit around the port 314. In the example provided, the inner seal surface 510 is a smooth surface. In an alternative construction, the inner seal surface is a textured surface or includes a plurality of ridges.

The bottom axial surface 522 contacts the top surface 326 of the inner member 26 to form a seal therewith. In the example provided, the bottom axial surface 522 is a smooth surface. In an alternative construction, the bottom axial surface is a textured surface or includes a plurality of ridges.

The landing 358 is received in the groove 526 and contacts the side surfaces 538 to form a seal therewith. In the example provided, the axial thickness 418 of the landing 358 is greater than the groove width 546 (shown in FIG. 5), such that the landing 358 fits into the groove 526 in a press fit or an interference fit. In the example provided, the radial length 422 of the landing 358 is less than the depth 550 of the groove 526, such that the landing 358 is spaced apart from the trough surface 542 by a gap. The gap between the landing 358 and the trough surface 542 accommodates movement, tolerance stack-up, assembly deformations, or thermal expansion in the radial direction. In an alternative construction, not specifically shown, the radial length 422 of the landing 358 is greater than or equal to the depth 550, such that the landing 358 contacts the trough surface 542. In the example provided, the side surfaces 538 and the trough surface 542 are smooth. In an alternative construction, the side surfaces 538 and the trough surface 542 are textured or include a plurality of ridges.

In the example provided, the bottom axial seal length 558 (best shown in FIG. 5) is greater than the landing distance 426 between the landing 358 and the top surface 326 of the inner member 26, such that the seal member 310 has a press fit or an interference fit axially between the landing 358 and the top surface 326 of the inner member 26. In the example provided, the bottom axial surface 522 is smooth. In an alternative construction, the bottom axial surface 522 is textured or includes a plurality of ridges.

In the example provided, the top axial seal length 554 (best shown in FIG. 5) is greater than the distance 434 between the landing 358 and the lower chamber wall 362, such that the seal member 310 has a press fit or an interference fit axially between the landing 358 and the lower chamber wall 362. In the example provided, the top axial surface 518 is smooth. In an alternative construction, the top axial surface 518 is textured or includes a plurality of ridges.

In the example provided, the radial width 530 (best shown in FIG. 5) of the seal member 310 is greater than the radial distance 414 between the inner surface 410 of the outer wall 354 and the outer cylindrical surface 322 of the port 314, such that the seal member 310 has a press fit or an interference fit in the radial direction between the inner surface 410 and the port 314. In an alternative construction, the radial width 530 (best shown in FIG. 5) is greater than the radial distance 414 to establish compression of the seal member 310 for sealing and isolation. In the example provided, the outer seal surface 514 is smooth. In an alternative construction, the outer seal surface 514 is textured or includes a plurality of ridges.

Figure 6:
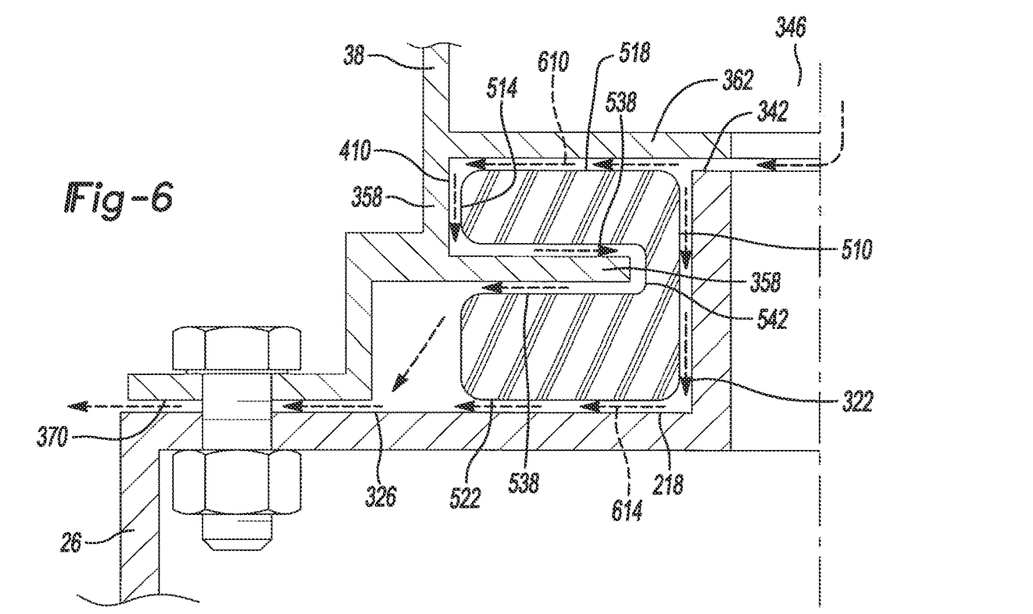
FIG. 6 is a schematic view similar to FIG. 4, schematically illustrating paths required for fluid to leak past the seal.

With additional reference to FIG. 6, a pair of leak paths 610 and 614 from the oil-mist chamber 346 to outside the outer member 38 and the inner member 26 are illustrated. In FIG. 6, the dimensions of the seal member 310 relative to the outer member 38 and the inner member 26 are schematically reduced from their actual relative dimensions for the purpose of better illustrating the leak paths 610 and 614.

With reference to leak path 610, fluid (e.g., oil) must pass in a serpentine path to escape past the seal member 310. More specifically, the fluid must pass sequentially between: the lower chamber wall 362 and the end 342 of the port 314; the top axial surface 518 and the lower chamber wall 362; the inner surface 410 and the outer seal surface 514; the landing 358 and one of the side surfaces 538; the landing 358 and the trough surface 542; the landing 358 and the other of the side surfaces 538; the outer seal surface 514 and the flange 350; and the flange surface 370 and the top surface 326 of the inner member 26.

With reference to leak path 614, fluid (e.g., oil) must pass two sides of the seal member 310 to escape past the seal member 310. More specifically, the fluid must pass sequentially between: the lower chamber wall 362 and the end 342 of the port 314; the inner seal surface 510 and the outer cylindrical surface 322 of the port 314; the bottom axial surface 522 and the top surface 326 of the inner member 26; and the flange surface 370 and the top surface 326 of the inner member 26.

Figure 7:
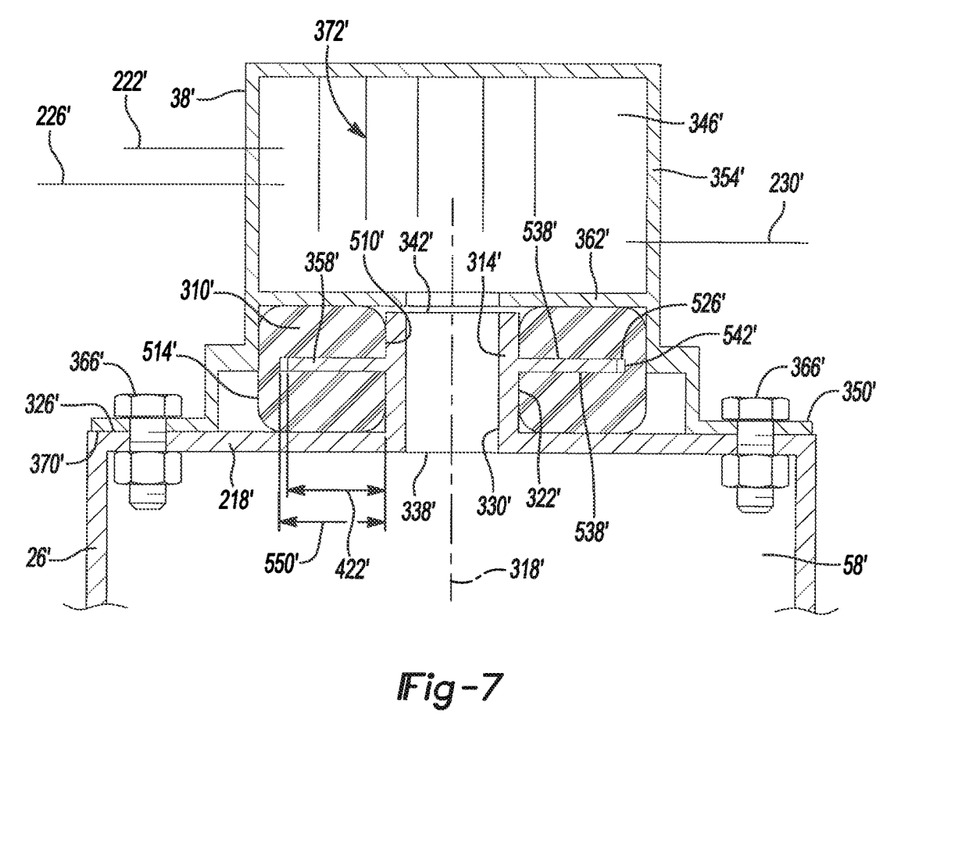
FIG. 7 is a sectional view of a portion of an inner member, an outer member, and a seal of a second configuration in accordance with the present teachings.

With additional reference to FIG. 7, an inner member 26', an outer member 38', and a seal member 310' of a second configuration are illustrated. The inner member 26' is similar to the inner member 26 (shown in FIGS. 1-4 and 6) except as otherwise shown or described herein. The outer member 38' is similar to the inner member 38 (shown in FIGS. 1-4 and 6) except as otherwise shown or described herein. The seal member 310' is similar to the seal member 310 (shown in FIGS. 3-6) except as otherwise shown or described herein. Accordingly, primed reference numerals denote features that are similar to features having similarly, but non-primed reference numerals described above, except as otherwise shown or described herein.

The landing 358' is similar to the landing 358, except that the landing 358' extends from the port 314' instead of from the outer member 38'. The landing 358' extends radially outward from the outer cylindrical surface 322' of the port 314' by a radial length 422'.

The groove 526' of the seal member 310' is similar to the groove 526, except that the groove 526' extends circumferentially about the inner seal surface 510' instead of the outer seal surface 514'. The groove 526' is open at the inner seal surface 510' and extends radially outward therefrom, but terminates radially inward of the outer seal surface 514'. The groove 526' includes a pair of opposing side surfaces 538' that extend radially outward from the inner seal surface 514' to an outer trough surface 542' that extends axially between the side surfaces 538'. The trough surface 542' is spaced apart from the inner seal surface 510' such that the groove 526' has a depth 550'.

The landing 358' is received in the groove 526' and contacts the side surfaces 538 to form a seal therewith. In the example provided, the axial thickness of the landing 358' is greater than the axial width of the groove 526', such that the landing 358' fits into the groove 526' in a press fit or an interference fit. In the example provided, the radial length 422' of the landing 358' is less than the depth 550' of the groove 526', such that the landing 358' is spaced apart from the trough surface 542' by a gap. The gap between the landing 358' and the trough surface 542' accommodates movement, tolerance stack-up, assembly deformations, or thermal expansion in the radial direction. In an alternative construction, not specifically shown, the radial length 422' of the landing 358' is greater than or equal to the depth 550', such that the landing 358' contacts the trough surface 542'. In the example provided, the side surfaces 538' and the trough surface 542' are smooth. In an alternative construction, the side surfaces 538' and the trough surface 542' are textured or include a plurality of ridges.

In operation, the seal member 310, 310' provides improved sealing over traditional o-ring style seals (not shown) by providing greater sealing surface area. To this effect, the seal member 310, 310' provides continued sealing despite assembly deformations, tolerance stack-up, or differential thermal expansion or contraction of the inner member 26, 26' and the outer member 38, 38'. The seal member 310, 310' also provides greater vibrational damping and isolation to reduce noise and wear that can result from vibration of the outer member 38, 38' relative to the inner member 26, 26' when traditional o-ring style seals (not shown) are used. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seal assembly comprising:
an outer member, the outer member including an outer wall and a landing, the outer wall having a cylindrically shaped inner surface disposed about an axis, the inner surface of the outer wall facing radially inward relative to the axis and configured to oppose an outer cylindrical surface of a port, the outer cylindrical surface of the port being radially inward of the inner surface of the outer wall and facing radially outward relative to the axis, the landing extending radially inward from the inner surface of the outer wall; and
an annular seal member disposed about the axis and having an inner cylindrical surface, a bottom axial surface, an outer cylindrical surface, and a circumferential groove, the inner cylindrical surface of the seal member configured to form a seal with the outer cylindrical surface of the port, the circumferential groove being open at the outer cylindrical surface of the seal member and extending radially inward, wherein the landing extends into the circumferential groove and is in sealing contact with the circumferential groove.

2. The seal assembly of claim 1, further comprising:
an inner member including an opposing wall and the port, the port extending axially outward from the opposing wall to an end of the port, wherein the landing is disposed axially between the opposing wall of the inner member and the end of the port.

3. The seal assembly of claim 2, wherein the bottom axial surface of the seal member is in sealing contact with the opposing wall of the inner member.

4. The seal assembly of claim 3, wherein the seal member is formed of a compressive material and the seal member has an uncompressed axial length between the circumferential groove and the bottom axial surface that is greater than an axial distance between the landing and the opposing wall of the inner member.

5. The seal assembly of claim 2, wherein the outer member is fixedly coupled to the inner member.

6. The seal assembly of claim 5, further comprising a plurality of fasteners, wherein the outer member further includes a flange fixedly coupled to the outer wall, wherein the fasteners fixedly couple the flange to the opposing wall of the inner member.

7. The seal assembly of claim 2, wherein the seal member is formed of a compressive material and an uncompressed diameter of the inner cylindrical surface of the seal member is less than a diameter of the outer cylindrical surface of the port.

8. The seal assembly of claim 2, wherein the inner member and the outer member are formed of different materials having different thermal expansion properties.

9. The seal assembly of claim 1, wherein the outer member further includes a chamber wall, the chamber wall extending radially inward from the inner surface of the outer wall and spaced apart from the landing, wherein the chamber wall is in sealing contact with a top axial surface of the seal member.

10. The seal assembly of claim 9, wherein the chamber wall has an inner diameter that is less than an outer diameter of the outer cylindrical surface of the port.

11. The seal assembly of claim 9, wherein the seal member is formed of a compressive material and the seal member has an uncompressed axial length between the groove and the top axial surface that is greater than an axial distance between the landing and the chamber wall.

12. The seal assembly of claim 1, wherein the seal member is formed of a compressive material and an uncompressed diameter of the outer cylindrical surface of the seal member is greater than a diameter of the inner surface of the outer wall.

13. The seal assembly of claim 1, wherein a diameter of the outer cylindrical surface of the seal member is less than a diameter of the inner surface of the outer wall such that the outer cylindrical surface of the seal member and the inner surface of the outer wall are spaced apart to define a gap therebetween.

14. The seal assembly of claim 1, wherein the circumferential groove extends radially inward from the outer cylindrical surface of the seal member to an inner trough surface, wherein the landing extends radially inward from the outer wall to an inner landing surface, the inner trough surface having a diameter that is less than a diameter of the inner landing surface such that the inner trough surface is spaced apart from the inner landing surface to define a gap therebetween.

15. The seal assembly of claim 1, wherein the seal member is formed of a compressive material and an uncompressed axial width of the circumferential groove is less than an axial thickness of the landing.

16. A seal assembly comprising:
an inner member, the inner member including an opposing wall and a port extending axially from the opposing wall along an axis to an end of the port, the port including an outer cylindrical surface and a landing, the outer cylindrical surface being disposed about the axis and configured to oppose a cylindrically shaped inner surface of an outer member, the landing extending radially outward from the outer cylindrical surface of the port and being disposed axially between the opposing wall and the end of the port; and
an annular seal member disposed about the axis and having an inner cylindrical surface, a bottom axial surface, an outer cylindrical surface, and a circumferential groove, the inner cylindrical surface of the seal member in sealing contact with the outer cylindrical surface of the port, the circumferential groove being open at the inner cylindrical surface of the seal member and extending radially outward, wherein the landing extends into the circumferential groove and is in sealing contact with the circumferential groove, wherein the bottom axial surface of the seal member is in sealing contact with the opposing wall of the inner member.

17. The seal assembly of claim 16, further comprising:
an outer member including an outer wall, the outer wall having a cylindrically shaped inner surface disposed about the axis and opposing the outer cylindrical surface of the port, the outer member being fixedly coupled to the inner member.

18. The seal assembly of claim 17, wherein the seal member is formed of a compressive material, wherein an uncompressed diameter of the inner cylindrical surface of the seal member is less than a diameter of the outer cylindrical surface of the port, wherein an uncompressed diameter of the outer cylindrical surface of the seal member is greater than a diameter of the inner surface of the outer wall, wherein an uncompressed axial distance between the groove and the bottom axial surface is greater than an axial distance between the landing and the opposing wall of the inner member.

19. The seal assembly of claim 17, wherein the groove extends radially outward from the inner cylindrical surface of the seal member to an outer trough surface, wherein the landing extends radially outward from the outer cylindrical surface to an outer landing surface, the outer trough surface having a diameter that is greater than a diameter of the outer landing surface such that the outer trough surface is spaced apart from the outer landing surface to define a gap therebetween.

20. The seal assembly of claim 17, wherein the seal member is formed of a compressive material and the outer member further includes a chamber wall, the chamber wall extending radially inward from the inner surface of the outer wall and spaced apart from the landing, wherein the chamber wall is in sealing contact with a top axial surface of the seal member.

* * * * *